Nov. 18, 1930.   J. J. CROTTY   1,781,682
SOIL PIPE
Filed March 15, 1928
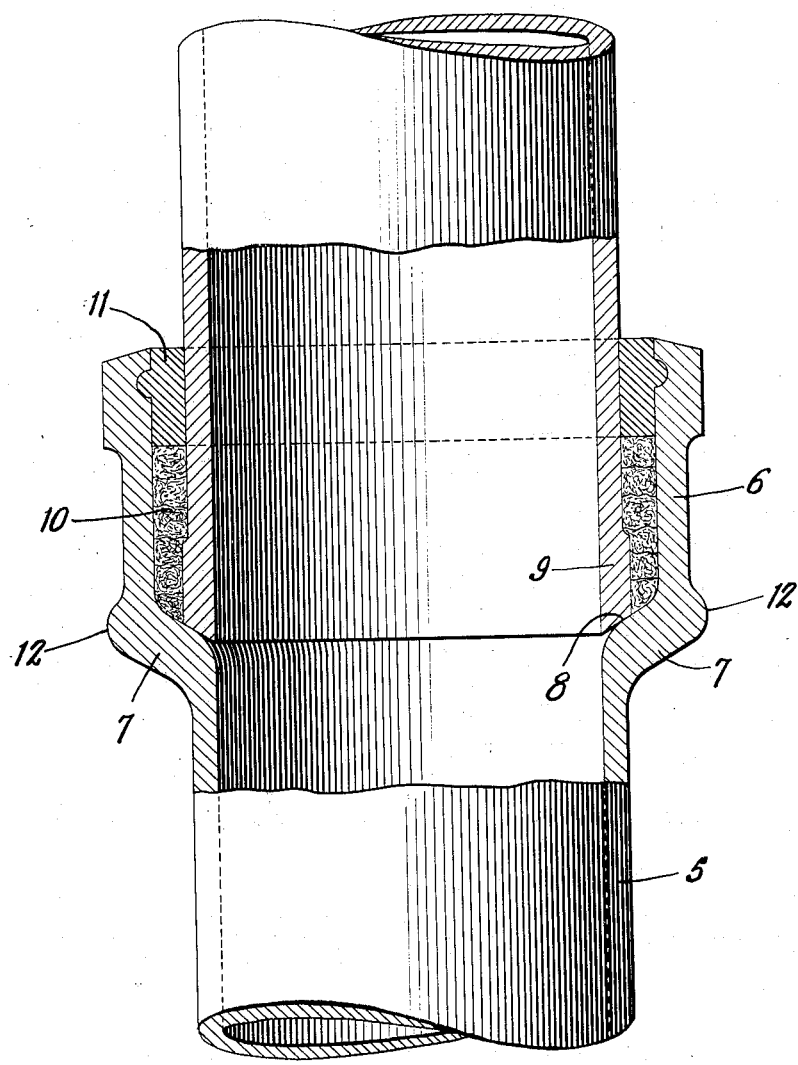
INVENTOR
JOSEPH J CROTTY
BY Clarence Kerr
ATTORNEY Patented Nov. 18, 1930

1,781,682

UNITED STATES PATENT OFFICE

JOSEPH J. CROTTY, OF NEW YORK, N. Y., ASSIGNOR TO THE UNIVERSAL PIPE AND RADIATOR COMPANY, OF NEW YORK, N. Y., A CORPORATION OF MARYLAND

SOIL PIPE

Application filed March 15, 1928. Serial No. 261,801.

The present invention relates to plumbing and has for an object to provide an improved soil pipe structure.

The usual manner of use of soil pipes in vertical lines is such that the accumulated weight of a considerable number of lengths of pipe sections rests upon the shoulder of a lower section, thus placing a considerable stress on the section where the bell end joins the main pipe section.

During transportation the lengths of pipe are roughly handled and considerable breakage occurs. Most of the breakage during installation or in use and most of the breakage during transportation and handling occurs from failure of the bell end at the point where it joins the main pipe section. Much of this breakage is due to thinness of the pipe at this point resulting from inaccurate positioning of the core in the mold.

The present invention provides a method of forming the pipe and provides a resulting pipe structure such that the bell end and the tapered portion joining it to the main body of the pipe are strengthened to resist the stresses of use by making the tapered connecting section thicker than the adjacent sections and by providing a reinforcing bead to give greater strength to such tapered section and to the bell end as a whole.

The nature and objects of the invention will be better understood from a consideration of a particular embodiment thereof, for the purposes of which description reference should be had to the accompanying drawing forming a part hereof and in which—

The figure is a central sectional view of the bell end of a length of cast iron pipe embodying the invention showing the end of an adjacent pipe length secured therein.

The pipe shown for the purposes of illustrating the invention is formed with a bell end strengthened to avoid breakage. The main section 5 of the pipe is connected to the enlarged bell end 6 by a tapered section 7 forming an inner shoulder 8 on which rests in use the weight of the length of pipe above. The end 9 of the adjacent pipe length is shown inserted in the bell end 6 and secured by the packing 10, 11 as is usual.

In accordance with the present invention, this tapered section 7 is made thicker than usual in order to insure strength at this point to resist the stresses of use and rough handling. The extent of thickening of the tapered portion may vary. It has been found effective to form this section of a thickness approximating twice the thickness of the main pipe section, as indicated in the drawing. This portion and the adjacent larger section are further reinforced and strengthened by a bead 12 extending circumferentially of the pipe. The bell end thus strengthened permits the tight calking of the joint without danger of rupture of the bell end.

The structure shown has the further advantage that in the event of a slight inaccurate placing of the core a resulting thinning of the wall of the tapered portion 7 will not too seriously impair the strength of this portion. The greater thickness also reduces detrimental crystallization.

The described method of forming the connection with the bell end is of course equally applicable to the various pipe fittings.

The specific description of a particular embodiment of the invention is illustrative merely and is not intended as defining the limits of the invention.

I claim:

1. In a pipe joint of the bell and spigot type a bell having an interior tapered shoulder adapted to receive the tapered spigot end of an adjacent pipe, the wall of said bell being substantially thickened at said shoulder to reinforce the same, the thickened portion being gradually merged into the main section of said pipe and the main wall of the bell without abrupt alterations in thickness and without abrupt shoulders, said thickened portion at its outer end extending beyond the main wall of said bell end to form a reinforcing bead.

2. In a pipe joint of the bell and spigot type a bell having a tapered interior shoulder adapted to support the tapered spigot end of a pipe above it, said spigot end being radially spaced from the wall of said bell throughout so as to permit insertion of packing between them, said shoulder being reinforced to withstand the weight of the pipes above it and the expanding forces of the packing by substantially thickening the wall at said shoulder, smoothly merging the thickened wall into the thinner wall of the main body of the pipe and the main portion of the bell so as to avoid abrupt shoulders and abrupt alterations in thickness, and extending the thickened wall beyond the normal periphery of the bell to produce a bead.

In testimony whereof, I have signed my name to this specification this 14th day of March, 1928.

JOSEPH J. CROTTY.